United States Patent [19]

Policastro et al.

[11] Patent Number: 4,916,194

[45] Date of Patent: Apr. 10, 1990

[54] FLAME RETARDANT AROMATIC POLYCARBONATE BLENDS

[75] Inventors: Peter P. Policastro, Niskayuna, N.Y.; Pamela K. Hernandez, North Olmsted, Ohio; Gary C. Davis, Albany; Jonathan D. Rich, Rexford, both of N.Y.

[73] Assignee: General Electric Company, Schenectady, N.Y.

[21] Appl. No.: 319,026

[22] Filed: Mar. 6, 1989

[51] Int. Cl.$^4$ .................................................. C08L 69/00
[52] U.S. Cl. ....................................... 525/433; 525/439; 525/464; 525/474
[58] Field of Search ............... 525/433, 439, 464, 474; 260/DIG. 24

[56] References Cited

U.S. PATENT DOCUMENTS 4,595,732 6/1986 Ryang .................................. 525/417

Primary Examiner—Theodore E. Pertilla
Attorney, Agent, or Firm—William A. Teoli; James C. Davis, Jr.; William H. Pittman

[57] ABSTRACT

Flame retardant aromatic polycarbonate compositions are provided resulting from the use of certain poly(arylene silicon) materials in combination with aromatic polycarbonates. Included among the poly(arylene silicon) materials are aromatic polyester silioxanes, aromatic polyimide siloxanes and aromatic polysilphenylenes.

10 Claims, No Drawings

FLAME RETARDANT AROMATIC POLYCARBONATE BLENDS

CROSS REFERENCE TO RELATED APPLICATIONS

Reference is made to copending applications Ser. No. 07/319,025, filed Mar. 6, 1989, "Silicone-Polycarbonate Block Copolymers", Ser. No. 07/319,027, filed Mar. 6, 1989 for "Aromatic Polyester-Siloxanes Block Copolymers' and Ser. No. 07/319,028, filed Mar. 6, 1989 for "Liquid Crystalline Polyester-Siloxanes" which are filed concurrently herewith, assigned to the same assignee as the present invention, and incorporated herein by reference.

BACKGROUND OF THE INVENTION

The present invention relates to flame retardant aromatic polycarbonates resulting from the blending into polycarbonate of certain arylene silicon materials having silicon atoms attached to the arylene nucleus by carbon-silicon bonds.

Prior to the present invention, certain organosilicon materials, such as organosilanes, were employed as plasticizers with polycarbonates as shown by Mark et al., U.S. Pat. No. 4,230,611. In addition, U.S. Pat. No. 4,273,691, Acquiri et al. and U.S. Pat. No. 4,387,176, Frye teach that certain silicone materials or silicone blends, when used in combination with alkaline earth metal salts, can impart improved flame retardant properties to various organic polymers.

Other flame retardants which have been employed in aromatic polycarbonates are, for example, metal salts of monomeric or polymeric-substituted aromatic sulfonic acids, such as shown by Mark et al., U.S. Pat. No. 3,933,734 and Mark, U.S. Pat. No. 3,940,366. Additional flame retardants which have been employed in aromatic polycarbonates are, for example, brominated phenyl ethers and metallic salts, such as antimony trioxide. Experience has shown, however, that although improved flame resistance has been imparted to aromatic polycarbonates utilizing the aforementioned flame retardants, undesirable toxic by-products of combustion often are emitted which have interfered with the commercial acceptance of flame retardant polycarbonates in many instances.

The present invention is based on the discovery that certain poly(arylene silicon) materials or arylene silicon polymers having chemically combined units selected from the class consisting of

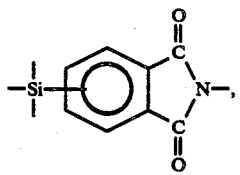

(1)

(2)

-continued

(3)

and mixtures thereof, can be incorporated into aromatic polycarbonates to impart improved flame retardant properties thereto, where a is a whole number equal to 0 or 1 and the unsatisfied valence bonds of the silicon atoms of formulas (1–3) can be satisfied by $C_{(1-13)}$ monovalent organic radicals, oxygen atoms or mixtures thereof.

As used hereinafter, the term "flame retardance" or "nonflammable" with respect to the flame retardant polycarbonate compositions of the present invention means that the flame retardant polycarbonates have satisfied UL94 V-O requirements for flammability, as shown by the "Flammability of Plastic Materials Bulletin" of Jan. 24, 1980. More particularly, a $5'' \times \frac{1}{2}'' \times \frac{1}{8}''$ polycarbonate test bar containing an effective amount, as defined hereinafter, of the arylene silicon material of the present invention, as shown by formulas (1–3), is suspended vertically over a $\frac{3}{4}$ Bunsen Burner flame as provided in the aforementioned UL94 test. The test sample preferably exhibits a UL94 V-O rating which includes the following criteria:

A. Not have any specimen which burn with flaming combustion for more than 10 seconds after application of the test flame.
B. Not have a total flaming combustion time exceeding 50 seconds for 10 flame applications for each set of five specimens.
C. Not have any specimens which burn with flaming or glowing combustion up to the holding clamp.
D. Not have any specimens which drip flaming particles that ignite dry absorbent surgical cotton located 12 inches (305 mm) below the test specimen.
E. Not have any specimens with glowing combustion which persists for more than 30 seconds after the second removal of the test flame.

STATEMENT OF THE INVENTION

There is provided by the present invention, a poly(aryl carbonate) composition exhibiting enhanced flame retardant properties comprising poly(aryl carbonate) and poly(arylene silicon) material, where the poly(arylene silicon) material is present at up to about 50% by weight of the polycarbonate composition, and there is present in the polycarbonate composition, from about 0.5 to about 40 mole percent, based on the total moles of arylcarbonate units of the poly(aryl carbonate) of arylene silicon units selected from formulas (1–3) and mixtures thereof.

The organic radicals which can satisfy the unoccupied valence bonds of the silicon atoms of formulas (1–3) are selected from $C_{(1-13)}$ monovalent hydrocarbon radicals or $C_{(1-13)}$ monovalent hydrocarbon radical substituted with radicals inert during equilibration or condensation.

There are included within the organic radicals of formulas (1–3), $C_{(1-8)}$ alkyl radicals, such as methyl, ethyl, propyl, butyl, pentyl, hexyl and heptyl; substituted alkyl radicals such as trifluoropropyl radicals and cyanoalkyl radicals such as cyanoethyl and cyanopropyl. The organic radicals attached to silicon of formulas (1–3) also can be alkenyl radicals such as vinyl and propenyl and cycloaliphatic such as cyclohexyl and cycloheptyl. In addition, the organic radicals can be selected from $C_{(6-13)}$ aryl radicals such as phenyl, tolyl, xylyl, naphthyl, anthryl and halogenated derivatives thereof, such as chlorophenyl, bromotolyl, chloronaphthyl, etc.

Among the poly(arylene silicon) materials having chemically combined units of formula (1), there are silicone polyimides as shown by Rich et al., U.S. Pat. No. 4,795,680 and copending application Ser. No. 07/319,025, which are incorporated herein by reference. The poly(arylene silicon) materials having chemically combined units of formula (1) can be prepared by the condensation of a phthalic anhydride-terminated polydiorganosiloxane of the formula

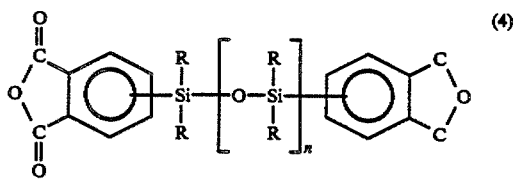

(4)

with arylenediamine

(5)

where R is included within the definition of the $C_{(1-13)}$ monovalent organic radicals which can satisfy the unoccupied valence bonds of formulas (1-3) as previously defined, $R^1$ is a $C_{(6-13)}$ divalent arylene radical and n is an integer equal to from 1 to 100 inclusive.

Additional poly(arylene silicon) material having chemically combined units of formula (1), can be made in accordance with the teaching of copending application Ser. No. 07/319,025 utilizing a polydiorganosiloxane having terminal substituted phthalimide groups of the formula

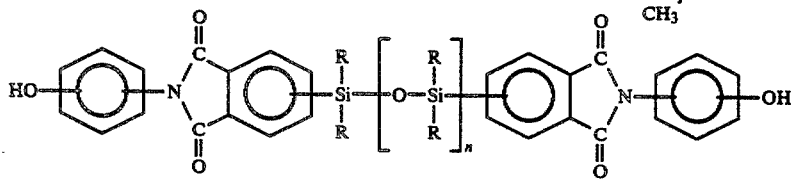

where R and n are as previously defined. As disclosed in Ser. No. 07/319,025, the bisphenol of formula (6) can be converted to a polycarbonate by use of a bischloroformate of a dihydric phenol, such as bisphenol A, and additional bisphenol A. Phosgenation of a mixture of the bisphenol of formula (6) with a dihydric phenol, such as bisphenol A is also feasible.

Poly(arylene silicon) materials having chemically combined units of formula (2) can be made by using aroylhalide-terminated polydiorganosiloxanes having the formula

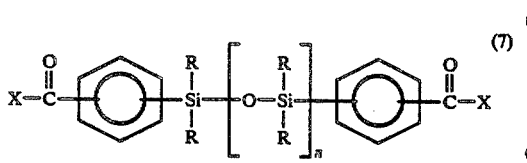

(7)

which are shown in Rich, U.S. Pat. No. 4,604,477, incorporated herein by reference where R and n are as previously defined and X includes halogen, such as chloro. There also is shown in copending application Ser. No. 07/319,027, for "Aromatic Polyester-Siloxanes Block Copolymers" or copending application Ser. No. 07/319,028, for "Liquid Crystalline Polyester-Siloxanes", both filed concurrently herewith, that silicone diacids or diacid chlorides, as shown in formula (7) can be intercondensed with dihydric phenol and in particular instances, hydroxybenzoic acid, where X in formula (7) also can be selected from hydroxy. Some of the dihydric phenols which can be used to make the aromatic polyester-siloxanes useful in the practice of the present invention for making poly(arylene silicon) material having chemically combined units of formula (2) are included within the formula

(8)

where $R^2$ is a $C_{(6-13)}$ divalent aromatic hydrocarbon radical. Dihydric phenols included within formula (8) are, for example, 2,2-bis-(2-hydroxyphenyl)propane, 2,4'-dihydroxybiphenylmethane, bis-(2-hydroxyphenyl)methane, 2,2-bis-(4-hydroxyphenyl)propane, referred to hereinafter as "bisphenol A" or "BPA", 1,1-bis(4-hydroxyphenyl)ethane, 1,1-bis(4-hydroxyphenyl)propane, 4,4'-dihydroxybiphenyl, 4,4'-dihydroxy-3,3',5,5'-tetramethylbiphenyl, 2,4-dihydroxybenzophenone, 4,4'-dihydroxydiphenyl sulfone, 2,4'-dihydroxydiphenyl sulfone, 4,4'-dihydroxydiphenyl sulfoxide, 4,4'-dihydroxydiphenyl sulfide, tetramethylbisphenol A, 1,1-dichloro-2,2-bis(4-hydroxyphenyl)ethylene, 6,6'-dihydroxy-3,3,3',3'-tetramethylbis(1,1-spiroindane) (spirobiindane bisphenol),

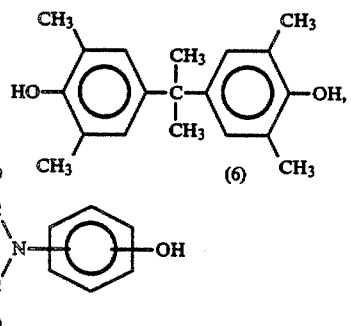

(6)

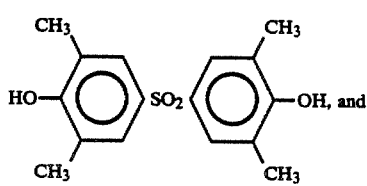

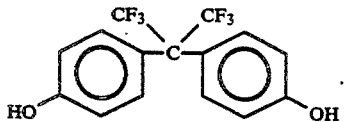

In addition to the dihydric phenols of formula (8), there also can be used in combination with the aroyl halide-terminated polydiorganosiloxane of formula (7), dicarboxylic acids of the formula

  (9)

wherein $R^3$ is a $C_{(6-13)}$ divalent aromatic hydrocarbon radical and X is as previously defined.

There are included within formula (9), dicarboxylic acids or acid chlorides such as

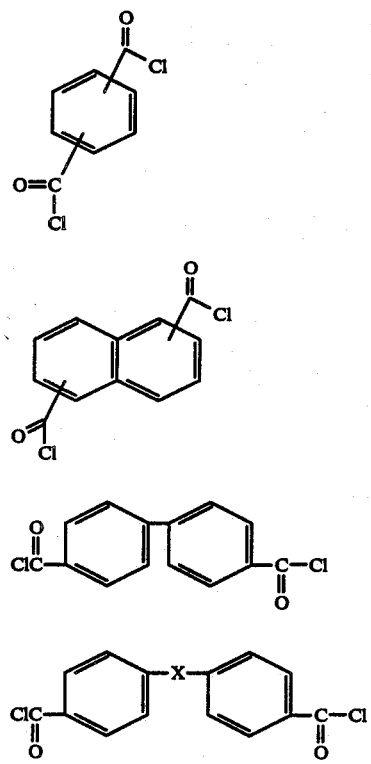

where X is selected from O, S, $SO_2$,

$C(R^5)_2$, and $R^5$ is H, $C_{(1-8)}$ alkyl and $CF^3$.

As shown in copending application Ser. No. 07/319,025, poly(arylene silicon) material having chemically combined units of formula (2) in the form of siloxane-polycarbonate block copolymers also can be made by effecting reaction between the aroyl halide-terminated polydiorganosiloxane of formula (7) and dihydric phenol of formula (8) in the presence of an acid acceptor, followed by phosgenating the resulting mixture in the presence of a chainstopper.

There are included by $R^1$ and $R^2$ of formulas (5) and (8), $C_{(6-13)}$ diarylene radicals such as phenylene, xylylene, tolylene and naphthylene.

Among the aromatic polycarbonates which can be rendered flame retardant in the practice of the invention, there are included those formed from the following bisphenols: p,p'-bisphenol A, m,p-bisphenol A, o,p-bisphenol A, spirobiindane bisphenol and tetramethylbisphenol. Copolycarbonates containing the aforementioned bisphenols as major bisphenol constituents are also included. Preferably, the polycarbonate is a bisphenol A (BPA) polycarbonate having an intrinsic viscosity (IV) of from 0.35 to 1.8 dl./g. in chloroform at 25° C.

In addition to the poly(arylene silicon) materials having chemically combined units of formula (1) or (2), beneficial flame retardant effects also have been found with poly(silarylene)s and preferably silphenylenes having chemically combined units of formula (3). Methods for making such silarylenesiloxanes are shown by Sveda, U.S. Pat. No. 2,562,001, while the corresponding silarylene halide and method for making it is shown by Rich, U.S. Pat. No. 4,709,054.

Although the functionalized poly(arylene silicon) materials of the present invention having chemically combined units as shown by formulas (1-3) are preferably used as flame retardants in polycarbonates, other aromatic polymers such as polyphenylene oxides, blends of polyphenylene oxides with polystyrene and aromatic polyesters also can be used in combination with the poly(arylene silicon) materials having chemically combined units of formulas (1-3) or mixtures thereof to produce flame retardant organic blends.

In the practice of the invention, the poly(arylene silicon) material is preferably melt blended with the poly(aryl carbonate) in proportions as previously defined. It has been found that the poly(arylene silicon) material, which hereinafter will mean the aromatic polyester-siloxane, siloxane-polycarbonate block copolymers, liquid crystalline polyester siloxane and silarylenesiloxane or silylarylene, having chemically combined units selected from formulas (1-3) or mixtures thereof, preferably should contain at least a major portion by weight of arylsilicon units selected from formulas (1-3) based on the total weight of polymer. The amount of the arylene silicon material used in the aromatic polycarbonate is preferably an amount which will not substantially alter the high impact glazing characteristics of the aromatic polycarbonate material. However, if the weight proportion of the poly(arylene silicon) units of formulas (1-3), based on the total weight of the polymer, is substantially less than a major proportion thereof, the amount of poly(arylene silicon) material required to be incorporated into the polycarbonate for flame retardance will likely alter the transparency and impact properties of the polycarbonate.

The flame retardant polycarbonate compositions of the present invention also can be reinforced with inert fillers such as silica filler, carbon fibers or glass fibers. The proportion of filler which can be utilized can vary from 1 to 100 parts of filler, per 100 parts of the poly(arylcarbonate) composition by weight.

In order that those skilled in the art will be better able to practice the present invention, the following examples are given by way of illustration and not be way of limitation. All parts are by weight.

EXAMPLE 1

A solution of 34.24 g of bisphenol A, 823 ml. of 10.3646M sodium hydroxide and 105 ml. of triethylamine was stirred for 5 minutes under nitrogen atmosphere. There was then added to the solution, 10.15 g. of terephthaloyl chloride, 10.15 g. of isophthaloyl chloride and 20.57 g. of 1,2-bis(4-benzoylchloro)-1,1,2,2-tetramethyldisiloxane dissolved in 400 ml. of methylene chloride. The contents were stirred vigorously for 4 hours, extracted twice with dilute HCl, five times with deionized water, dried over $MgSO_4$, filtered, precipitated into methanol and dried at 90° C. for 24 hours under vacuum. There was obtained an aromatic polyester-siloxane copolymer having an Mn of 35,900, a Mw of 108,100, a MWD of 3.01 and a Tg of 145° C. The siloxane polyester copolymer was melt blended in an extruder with Lexan® polycarbonate 140 powder, a product of the General Electric Company, at a weight ratio of 5:95 of siloxane polyester to polycarbonate. The blend was injection molded into ⅛ flame bars and tested for flammability by the standard UL94 procedure. The blend was found to be V-O by the UL94 test compared to the polycarbonate control which failed the test due to its propensity to burn and drip once ignited. The oxygen index of the siloxane polyester polycarbonate blend was 37% at ⅛" as compared to a polycarbonate control of 28%.

EXAMPLE 2

A mixture of 1.00 g. of oxydianiline, 2.13 g of the 1,2-bis(4-phthalic anhydride, 1,1,2,2-tetramethyldisiloxane, 15 mg. of phthalic anhydride, 30 mg. of phthalic anhydride, 30 mg. of dimethylaminopyridine and 80 ml. of o-dichlorobenzene was refluxed under a nitrogen atmosphere. Upon complete azeotropic water removal, the mixture was heated at 175° C. for 4–6 hours. The solution was then cooled to room temperature and precipitated into methanol. There was obtained a siloxane polyimide having a Mn of 18,000, a Mw of 83,000 and MWD of 4.61. The polymer had an intrinsic viscosity of 0.66 dl./g. and a Tg of 160° C. The siloxane polyimide copolymer was melt blended in an extruder with Lexan® polycarbonate 140 at 280° C. with a weight ratio of 5:95 siloxane polyimide to polycarbonate. The resulting immiscible blend was molded into ⅛" flame bars. It was found that the blend of siloxane polyimide and polycarbonate was V-O by the UL94 procedure.

EXAMPLE 3

A solution of 50 g. of p-phenylene bis(dimethylsilanol), 35 ml. of toluene and 0.1 g. of n-hexylammonium 2-ethylhexanoate was refluxed. After 6 hours when water evolution had essentially ceased, the solution was poured into a large excess of methanol to give a tough fibrous polymer. The polymer was collected by filtration, washed with methanol and dried in vacuum at 70° C. for 12 hours. There was obtained a 98% yield of polysilphenylene siloxane, Mn 203,000, MW 449,000 and MWD 2.22. The polymer's intrinsic viscosity was 1.732 dl./g.; Tg 94° C. and Tm 134° C. A blend of the polysilphenylene and Lexan® polycarbonate of Example 1 having 5% by weight of the polysilphenylene based on the weight of the blend was melt blended in a twin screw extruder at 280° C. The resulting immiscible blend was molded into ⅛" flame bars. It was found to be V-1 by the UL94 procedure.

The above procedure was repeated except that in place of the polysilphenylene there was incorporated into the polycarbonate 5% by weight of octaphenylcyclotetrasiloxane. The resulting transparent blend was molded into ⅛" flame bars. It was observed to fail the UL94 test because it burned and dripped in a manner similar to the polycarbonate control. The same procedure was repeated except that in place of the p-polysilphenylene there was used 5% by weight of a polyphenylsilsesquioxane. The resulting immiscible blend was molded into ⅛" flame bars. It was observed to fail the UL94 test by burning and dripping similar to the polycarbonate control.

EXAMPLE 4

A polyestercarbonate siloxane copolymer was prepared by adding a methylene chloride solution of 10.28 g. of an aryl halide-terminated polydimethylsiloxane within the scope of formula (7), where R is methyl, n is 1, and X is chloro, to a stirred solution of 11.42 g. of bisphenol A, 150 ml. of methylene chloride and 0.3 g. of triethylamine. The mixture was phosgenated while being vigorously stirred at a pH of 9 to 11 over a 21 minute period. It was then extracted with 3N hydrochloric acid and four times with dionized water. The copolymer was isolated by precipitation into methanol. Based on method of preparation, the polymer was a polyestercarbonate siloxane having about 25 mole percent of phenylenesilicon units of formula (2).

The above procedure was repeated except that the resulting polyestercarbonate siloxane had 7.5 mole percent of formula (2) units.

Blends were prepared using the above polyestercarbonate siloxanes with a bisphenol A polycarbonate having 0.52 IV. The first blend had 30 g. of polycarbonate and 5.8 g. of the 25 mole percent phenylenesilicon polyestercarbonate siloxane. The second blend had 20 g. of the 7.5 mole percent polyestercarbonate siloxane and 20 g. of polycarbonate.

Both samples after drying were compression molded into ⅛" test bars and subjected to the UL-94 test. The 25 mole percent phenylenesilicon polyestercarbonate siloxane tested V-O with an average (10 burns) flame-out time (FOT) of 3.12 seconds. The second blend tested V-1 with an FOT (10 burns) of 7.22 seconds. It was further found that a polycarbonate blend with 2 g. of a sample having 25 mole percent of formula (2) units and 20 g. of polycarbonate failed the UL-94 test when tested as a 1/16" slab instead of a ⅛" slab. A possible explanation is that the flow properties at 1/16" were significantly different from the ⅛" test slabs.

Although the above examples are directed to only a few of the very many variables which can used in the practice of the present invention, it should be understood that the present invention is directed to the use of a much broader variety of polyestersiloxanes, liquid crystalline polyestersiloxanes, siloxane polyimides and siloxane polycarbonates. In addition, siloxane polyamides and siloxane polyurethanes also can be used, where all of the aforementioned siloxane copolymers have one or more of the chemically combined units of formulas (1-3) or mixtures thereof as well as other polycarbonate and organic polymers as set forth in the description preceding these examples.

What is claimed is:

1. An aromatic polycarbonate composition exhibiting enhanced flame retardant properties comprising aromatic polycarbonate and poly(arylene silicon) material, where the poly(arylene silicon) material is present at up to about 50% by weight of the aromatic polycarbonate composition and there is present in the polycarbonate composition from about 0.5 to about 40 mole percent, based on the total moles of arylcarbonate units of the aromatic polycarbonate of arylene silicon units selected from the class consisting of

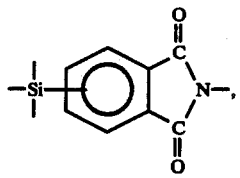

and mixtures thereof, where the unsatisfied valence bonds of the silicon atoms of the arylene silicon units are satisfied by a member selected from the class consisting of oxygen, a $C_{(1-13)}$ monovalent hydrocarbon radical, a $C_{(1-13)}$ monovalent hydrocarbon radical substituted with radicals inert during equilibration or condensation and mixtures thereof and a is a whole number equal to 0 or 1.

2. A flame retardant polycarbonate composition in accordance with claim 1, where the poly(arylene silicon) material is a siloxane polyimide.

3. A flame retardant polycarbonate composition in accordance with claim 1, where the poly(aryl silicon) material is a siloxane-polycarbonate copolymer.

4. A flame retardant polycarbonate composition in accordance with claim 1, where the poly(aryl silicon) material is a polysilphenylene.

5. A flame retardant polycarbonate composition in accordance with claim 1, where the poly(arylene silicon) material is an aromatic polyester siloxane.

6. A flame retardant bisphenol A polycarbonate composition comprising bisphenol A polycarbonate having an IV of from 0.35 to 1.8 dl./g. in chloroform at 25° C. and up to 50% by weight of the flame retardant bisphenol A polycarbonate composition of a poly(arylene silicon) material having from about 0.5 to about 40 mol. percent, based on the total moles of bisphenol A carbonate units of the bisphenol A polycarbonate of arylene-silicon units of the formula

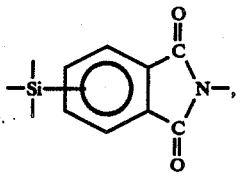

where the unsatisfied valence bonds of the silicon atoms of the arylene silicon units are satisfied by a member selected from oxygen, methyl groups and mixtures thereof.

7. A flame retardant polycarbonate composition in accordance with claim 6, where the poly(arylene silicon) material is an aromatic polyester-siloxane having chemically combined 1,2-bis(4-benzoylchloro)-1,1,2,2-tetramethyldisiloxane units.

8. A flame retardant polycarbonate composition in accordance with claim 6, where the poly(arylene silicon) material is an aromatic siloxane polyimide having chemically combined 1,2-bis(4-phthalic anhydride-1,1,2,2-tetramethyldisiloxane.

9. A flame retardant polycarbonate composition in accordance with claim 6, where the poly(arylene silicone) material is a polysilphenylene.

10. A flame retardant polycarbonate in accordance with claim 3, where the siloxane-polycarbonate copolymer has chemically combined

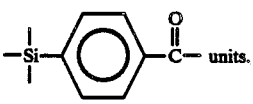

* * * * *